United States Patent [19]

Murai et al.

[11] 3,785,466

[45] Jan. 15, 1974

[54] DEVICE FOR HOLDING WIRE RINGS IN DIAPHRAGM CLUTCH

[76] Inventors: Okihiko Murai, 1-4, Horigaoka, Hirakata; Mamoru Okubo, 28-8, Hiraikecho, Neyagawa, both of Japan

[22] Filed: Oct. 2, 1972

[21] Appl. No.: 294,290

[52] U.S. Cl. ............................ 192/89 B, 192/70.27
[51] Int. Cl. ... F16d 13/44, F16d 23/00, F16d 23/02
[58] Field of Search ...................... 192/89 B, 70.27

[56] References Cited
UNITED STATES PATENTS

| | | | |
|---|---|---|---|
| 3,570,638 | 3/1971 | Baker | 192/70.27 |
| 3,417,846 | 12/1968 | Cook | 192/89 B |
| 3,712,436 | 1/1973 | Rist | 192/89 B |
| 3,595,355 | 7/1971 | Maucher | 192/89 B |
| 2,359,184 | 9/1944 | Wolfram | 192/70.27 |

Primary Examiner—Allan D. Herrmann
Assistant Examiner—Lance W. Chandler
Attorney—John C. Holman et al.

[57] ABSTRACT

A device comprising a diaphragm spring having a peripheral portion seated on the top ends of a plurality of projections along the same circumference on a side face of a pressure plate and retained on the pressure plate by clips, a clutch cover secured to a flywheel, a pair of split wire rings disposed on the opposite side surfaces of the diaphragm spring to fulcrum the diaphragm spring, and a plurality of connecting members for holding the wire rings in pressing contact with the opposite surfaces of the diaphragm spring and securing the same to the clutch cover at the same time, the clutch cover being formed in its wire ring bearing surface with a split annular groove for receiving the side face of the wire ring.

3 Claims, 2 Drawing Figures

DEVICE FOR HOLDING WIRE RINGS IN DIAPHRAGM CLUTCH

BACKGROUND OF THE INVENTION

The present invention relates to a device for holding wire rings in diaphragm clutches, more particularly to a device by which wire rings for fulcruming a diaphragm spring are fixedly held to the clutch cover.

It is already known in diaphragm clutches that the diaphragm spring is fulcrumed on a pair of wire rings in the form of a split annular body. In recent years, however, there is a tendency to step up the maximum rotational speed of the clutches, so that the centrifugal force acting on the wire rings becomes no longer negligible and it is concerned that the wire rings may possibly be displaced from the predetermined position. Should such displacement occur, the diaphragm spring would be fulcrumed at a deflected position to result in objections such as improper disengagement of clutch, reduction of the torque to be transmitted and increased wear on the clutch facing.

In addition to the prevention of radial displacement of the wire rings due to the centrifugal force, it is also necessary to prevent the same from displacement in the direction of rotation. In fact, the displacement of the wire rings generally takes place conjointly both in radial direction and in the direction of rotation.

SUMMARY OF THE INVENTION

An object of this invention is to eliminate occurrence of displacement of the wire rings retained on the clutch cover.

Another object of this invention is to provide a device for holding the wire rings which is capable of preventing the displacement of wire rings not only in the radial direction of the clutch but also in the direction of rotation thereof.

Still another object of this invention is to eliminate difficulties to be encountered in positioning the wire rings during assembly of the clutch.

In order to fulfil the foregoing objects, the clutch cover according to this invention is formed with a split annular groove for receiving the side face of a wire ring. The wire ring per se is in the form of a split annular body and the side face of the wire ring is engaged in the split annular groove for assembly. The wire ring and another split wire ring and a diaphragm ring are assembled with the clutch cover by a plurality of connecting members, whereby the displacement of the wire rings both in the radial direction and in direction of rotation of the clutch can be completely precluded.

According to this invention, therefore, the wire rings are free of any displacement to be otherwise caused by the centrifugal force due to high speed rotation of the clutch, to make it sure that the diaphragm spring will be fulcrumed at a permanently unaltered position and to completely eliminate objections due to the displacement of the wire rings such as improper disengagement of the clutch, reduction of the torque to be transmitted and slippage of the clutch facing. Thus the diaphragm clutch of this invention functions reliably for engagement and disengagement.

Furthermore according to this invention, the split annular groove serves to determine the position of the wire ring for the assembly of clutch, assuring efficient assemblage.

Other objects and features of this invention will become more apparent from the following description of an embodiment of this invention.

DESCRIPTION OF THE PREFERRED EMBODIMENT

Figure 1:
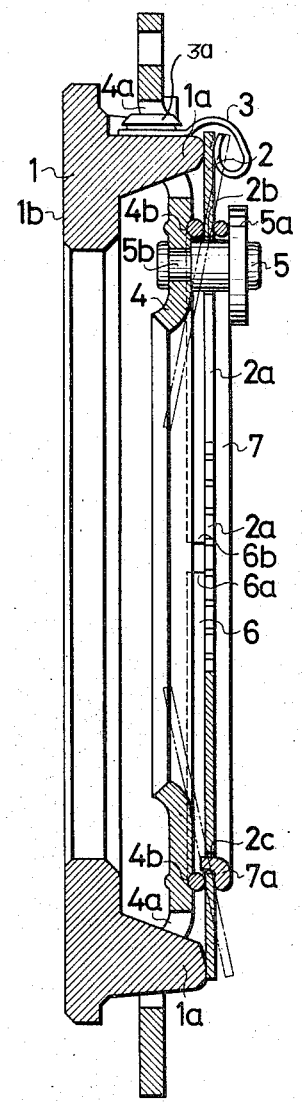
FIG. 1 is a view in vertical section showing the principal parts of this invention, with some known means of diaphragm clutch omitted.
Figure 2:
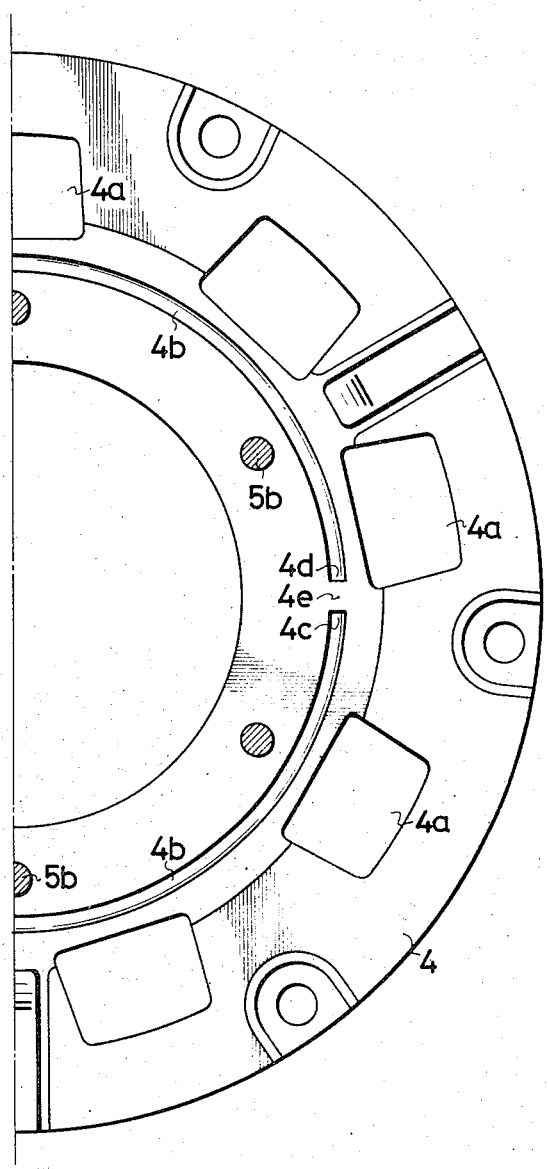
FIG. 2 is a side elevation showing one-half part of a clutch cover.

Referring to the drawings, a pressure plate 1 has on its side face a plurality of projections 1a arranged along the same circumference. As already known, the other face of the pressure plate 1 serves as a friction face 1b opposing the clutch facing of an unillustrated clutch disc. The other face of the clutch facing is in face-to-face relation to the friction surface of an unillustrated flywheel. Although unillustrated, the clutch disc has a hub splined to a driven shaft such as a main drive shaft for rotation therewith.

As shown in the drawing, the marginal portion of a diaphragm spring 2 is seated on the top end of projection 1a of the pressure plate 1, and the rolled end of each clip 3, secured at the other end to the projection 1a by a rivet 3a or the like, is in resilient contact with the outer face of marginal portion of the diaphragm spring 2 to retain the spring 2 on the pressure plate 1. The inner peripheral portions of the diaphragm spring 2 are divided radially into fingers 2a as already known.

A clutch cover 4 is secured at its outer peripheral portion to the peripheral side face of the unillustrated flywheel with locking bolts (not shown) and is formed with a plurality of openings 4a for receiving therein the projections 1a of the pressure plate 1 to permit axial movement of the pressure plate 1. The clutch cover 4 and pressure plate 1 are connected together with unillustrated strap plates or the like for conjoint rotation.

A wire ring 6 is interposed between the diaphragm spring 2 and the clutch cover 4. Another wire ring 7 is disposed between the outer face of the diaphragm spring 2 and flanges 5a of several connecting members 5 secured to the clutch cover 4. Each of the connecting members 5 passes through a hole 2b formed at the base of finger 2a of the diaphragm spring 2 and has its base 5b caulked to the clutch cover 4, whereby the pair of wire rings 6 and 7 is clamped between the flanges 5a and the clutch cover 4 in pressing contact with the diaphragm spring 2 to fulcrum the spring 2.

The wire ring 6 is in the form of a split annular body having ends 6a and 6b, and the other wire ring 7 is also in a split annular form and has ends 7a (one end not shown). As seen in the drawing, the two ends 7a of the wire ring 7 are suitably bent, the bent ends being engaged in holes 2c in the diaphragm spring 2 for keeping the wire ring in position.

The surface of the clutch cover 4 in contact with the wire ring is formed with a split annular groove 4b in conformity with the wire ring 6. The groove 4b receives one side face of the wire ring 6. The diaphragm spring 2 is placed on the other side face of the wire ring 6, with the wire ring 7 placed on the outer face of the spring 2, and the wire ring 7 is held by the flanges 5a of the connecting members 5. Caulking of the base portions 5b of the connecting members 5 to the clutch cover 4 fits the wire ring 6 into the split annular groove 4b and keeps the same in position against radial displacement. The ends 4c and 4d of the split annular groove 4b in engagement with the ends 6a and 6b of the ring prevent displacement of the ring in the direction of rotation of the clutch. In other words, the portion 4e defining the ends 4c and 4d of the annular groove 4b serves to prevent the displacement of the wire ring 6 in the direction of rotation.

The diaphragm spring 2 is shifted as indicated in phantom lines in the drawing by being fulcrumed on the wire rings 6 and 7 when its fingers 2a are pushed to the left by unillustrated clutch release bearing means, whereby the pressure plate 1 is urged rightward to disengage the clutch. When freed from the pressure exerted by the clutch release bearing means, the diaphragm spring 2 returns to the position indicated in the solid lines in the drawing to move the pressure plate 1 to the left and press the clutch facing against the flywheel, whereby the clutch is engaged. Thus, the wire rings are held in place against displacement, no matter how fast the clutch may be driven, to assure effective engagement and disengagement of the clutch.

What is claimed is:

1. A device for holding wire rings in a diaphragm clutch comprising, a diaphragm spring having a marginal portion seated on the top ends of a plurality of projections along the same circumference on a side face of a pressure plate and retained on the pressure plate by a plurality of clips, a clutch cover secured to a flywheel and formed in its side surface with a split annular groove for receiving the side face of a wire ring therein, a pair of wire rings each made of a split annular member and disposed on the opposite side surfaces of the diaphragm spring respectively to fulcrum the diaphragm spring, one of the wire rings being interposed between the diaphragm spring and the clutch cover and received at its side face in the annular groove of the clutch cover so as to be retained in position, and a plurality of connecting members for holding the wire rings in pressing contact with the diaphragm spring and securing the same to the clutch cover at the same time.

2. The device as set forth in claim 1 wherein the other of the pair of wire rings has its opposite ends bent and engaged in positioning holes formed in the diaphragm spring so as to be retained in place.

3. The device as set forth in claim 1 wherein the clutch cover is formed with a plurality of openings for receiving the projections of the pressure plate to permit axial movement of the pressure plate.

* * * * *